Patented June 9, 1953

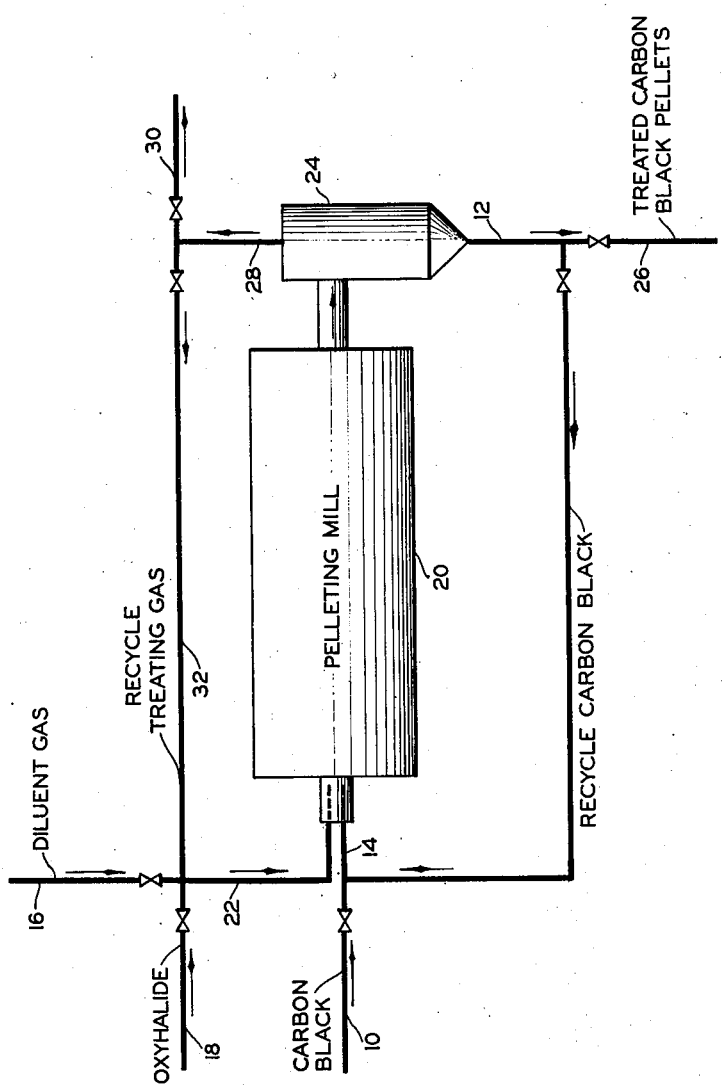

2,641,533

UNITED STATES PATENT OFFICE 2,641,533

TREATMENT OF CARBON BLACK WITH OXYHALIDES

Martin R. Cines and William T. Nelson, Bartlesville, Okla., assignors to Phillips Petroleum Company, a corporation of Delaware Application November 6, 1950, Serial No. 194,292

15 Claims. (Cl. 23—209.1)

This invention relates to treating carbon black. In one of its more specific aspects this invention relates to the reduction of the pH of carbon blacks, and specially relates to the treatment of high pH furnace carbon black with oxyhalides of nitrogen, phosphorus and sulfur, or mixtures thereof, whereby the pH of the furnace carbon black is reduced.

This is a continuous-in-part of our application, Serial No. 136,820, filed January 4, 1950, now abandoned.

The high pH of furnace carbon blacks is not in itself objectionable, but when these blacks are used in compounding rubber, particularly natural rubber, the rubber mix ordinarily has an undesirably low scorch time which gives rise to difficulties during the mixing and forming stages of processing. Rubber stocks which scorch during mixing, calendering, extruding, molding, etc. are difficult to handle and many times result in loss of the rubber mix. Lowering the pH of the furnace carbon blacks, such as high abrasion furnace carbon blacks (HAF blacks), high modulus furnace carbon blacks (HMF blacks), very fine furnace carbon blacks (VFF blacks), reinforcing furnace carbon blacks (RF blacks), etc., which usually have a pH of from 8 to 10.5, more usually from 8.5 to 10.1, has been found to effectively increase the scorch time of rubber mixes wherein the furnace carbon blacks are used. It is known that the pH of carbon blacks can be lowered by treating them with an oxygen-containing gas, such as air. However, relatively high temperatures in the neighborhood of 800° F. and higher are necessary, making the treating processes undesirable from the standpoint of equipment requirements and operational difficulties.

The pH of a carbon black is determined by boiling distilled water containing a sample of the black for about 15 minutes, allowing the carbon black to settle, decanting the water, and measuring the pH of the slurry of carbon black remaining.

We have now discovered that the pH of carbon black can be reduced by treating same with oxyhalides of nitrogen, phosphorus and sulfur. Mixtures of two or more oxyhalides can be used successfully in the process of our invention. Nitrogen oxyhalides which can be used in the practice of our invention are, for example, NOCl, NOF, NOBr, NOBr$_3$, NO$_2$Cl and NO$_2$F. Sulfur oxyhalides which can be used in the practice of our invention are, for example, SOCl$_2$, SO$_2$Cl$_2$, SOBr$_2$, SOF$_2$, SO$_2$F$_2$ and SOBrCl. Phosphorus oxyhalides applicable in the practice of our invention are, for example, POCl$_3$, POBr$_3$, POF$_3$, POBrCl$_2$ and POBr$_2$Cl. Other compounds capable of yielding the oxyhalides under the reaction conditions can be used where the products formed are not deleterious. The new furnace carbon black treating compounds of the process of our invention allows treating at relatively low temperatures, and permits versatile operation, that is, the pH of furnace carbon blacks having a pH of from 8.5 to 10.1 can be lowered to a pH as low as 3 or 4, or intermediate pH values can be obtained, as desired, by adjustment of the treating conditions.

It is an object of this invention to provide a method to lower the pH of carbon blacks, particularly a high pH furnace carbon black.

It is another object of this invention to provide new treating compounds to be used in treating carbon blacks, particularly high pH furnace carbon blacks, to lower the pH of the carbon black.

Other objects and advantages of the process of this invention will become apparent, to one skilled in the art, upon reading this disclosure.

The drawing which accompanies and is a part of this disclosure is a diagrammatic flow sheet setting forth a specific embodiment of the process of our invention as preferably carried out in a usual pelleting mill.

The process of our invention is practiced by contacting the carbon black with the oxyhalides, which is preferable, in the presence of a diluent gas, such as air, nitrogen, inert flue gas, etc. The oxyhalides can be carried by the diluent gas used in treating in concentrations of from 0.001 to about 5 volume per cent, though usually in an amount between 0.01 and 1 volume per cent. The quantity of treating gas used can be from 1 to 50 standard cubic feet for each pound of black, usually from 5 to 15 standard cubic feet per pound of black. Treating temperature is usually and preferably between atmospheric and 400° F. Lower temperatures can be used, but this normally involves refrigeration and is not necessary to give good and efficient results. Treating times can vary from about 1 minute up to 24 hours or longer, the type of apparatus used in treatment determining to a great extent the optimum time of treatment. Treatment at atmospheric pressure is satisfactory, though higher or lower pressures can be used. The apparatus and method disclosed by R. A. Ebel in application, Serial Number 125,332, filed November 3, 1949, can advantageously be used in carrying out the treating method of our invention.

Our process can be practiced before, during, or after pelleting of the carbon black. In most cases, however, carbon black is marketed in pellet form, and carrying out the treatment in the pellet mills necessitates adding only a very small amount of additional equipment and produces quite satisfactory results. The treatment can, however, be practiced using loose black or pellets, treatment being accomplished in fixed or fluidized bed or with the carbon black suspended in the treating stream. Batch or continuous operation can be utilized. It is preferred that water and water vapor be substantially excluded from the treating system.

The attached drawing is a flow diagram of one specific embodiment of the process of our invention as practiced in a pelleting operation. However, it is to be understood that the drawing or following discussion, referring to the drawing, are not to unduly limit the scope of our invention.

Referring now to the drawing, loose carbon black recovered from a furnace process is conducted through line 10 and is joined by recycle pellets from line 12. The total stream is then conducted into pellet mill 20 via line 14. A diluent gas, such as fresh air, is conducted through line 16 and is mixed with the oxyhalide added through line 18, the total stream then is passed into pellet mill 20 via line 22. The pelleting operation is ordinarily conducted within the limits of the previously-discussed reaction conditions suitable for treatment of the black in the presence of the oxyhalide to reduce the pH, and thus no substantial alteration of the usual pelleting operation is necessitated. In the rotating pellet mill, the bed of carbon black is turned over a great many times, resulting in thorough contacting of the black with the oxyhalide-containing treating gas, thereby reducing the pH of the black. The gas and treated carbon black pass from the outlet of the mill into separating drum 24. The pelleted carbon black is collected in the bottom of drum 24. The resulting pellets are removed from drum 24 through line 12, a portion of the stream being drawn off through line 26 to product storage, and the remainder, if recycling is necessary or desirable, is conducted to line 10 via line 12 and recycled to pelleting mill 20.

The gas which is separated in drum 24 from the total effluent of the mill, which is comprised of diluent gas and the oxyhalide, is removed through line 28, and is usually discarded in part through line 30. The remainder of the gas is passed through line 32 to line 22, joining the fresh air and oxyhalide, and thence recycled to pelleting mill 20. A blower (not shown) is usually necessary in order to recycle this gas to pelleting mill 20. In some applications it may be desirable to discard all the gas removed from separating drum 24, in which case the valve in line 32 is closed and all the gas is discarded through line 30.

In the process as described, the treating temperature, catalyst concentration, time of treatment, and other conditions should be within the ranges previously discussed, though these were not repeated in the description of the above specific embodiment.

The following are examples of our invention wherein a furnace carbon black having a pH of 9.1 (an HAF carbon black) was treated with air and nitrogen containing various oxyhalides. It is to be understood that the temperatures, pressures, concentrations, materials, etc. set forth in the examples are not to unduly limit the scope of our invention.

Eight runs were made under the conditions and with the results set forth in the following table. A circulating suspended bed of the carbon black was contacted with the treating gas in a cylindrical vessel. The gas was passed through continuously and not recycled.

| Run No. | Treating Gas | Mol Percent Oxyhalide in Treating Gas Stream | Treating Temp. (° F.) | Treating Time (min.) | Degassed pH of Treated Black |
|---|---|---|---|---|---|
| 1 | $POCl_3$—Air | $POCl_3$ 0.03 | 75 | 30 | 5.2 |
| 2 | $POCl_3$—purified $N_2$ | 0.03 | 75 | 30 | 5.8 |
| 3 | $SOCl_2$—Air | $SOCl_2$ 0.15 | 75 | 30 | 6.0 |
| 4 | $SOCl_2$—purified $N_2$ | 0.15 | 75 | 30 | 6.8 |
| 5 | $SO_2Cl_2$—Air | $SO_2Cl_2$ 0.35 | 75 | 30 | 3.6 |
| 6 | $SO_2Cl_2$—purified $N_2$ | 0.35 | 75 | 30 | 4.0 |
| 7 | NOCl—Air | NOCl 0.08 | 75 | 10 | 7.7 |
| 8 | NOCl—purified $N_2$ | 0.08 | 75 | 10 | 7.5 |

This same carbon black when treated with air or nitrogen alone under these conditions is substantially unaffected by the treatment.

As will be evident to those skilled in the art, various modifications of this invention can be made, or followed, in the light of this disclosure and discussion, without departing from the spirit or scope of this disclosure or from the scope of the claims.

We claim:

1. A process for treating a high pH furnace carbon black having a pH of from 8.5 to 10.1 to substantially lower its pH and thereby increase the scorch time of a rubber mix compounded therewith which comprises, contacting said carbon black with an oxyhalide selected from the group consisting of nitrogen oxyhalides, sulfur oxyhalides, phosphorus oxyhalides, and mixtures thereof, at a temperature of from atmospheric to 400° F. and recovering a resulting carbon black having a substantially reduced pH.

2. The process of claim 1 wherein said contacting is carried on while said oxyhalide is in gaseous form diluted by a diluent gas.

3. A process for treating a furnace carbon black having a pH of from 8.5 to 10.1 to substantially lower its pH and thereby increase the scorch time of a rubber mix compounded therewith which comprises, contacting said carbon black with from 1 to 50 standard cubic feet per pound of said carbon black of a diluent gas containing from 0.001 to 5 volume per cent of an oxyhalide selected from the group consisting of nitrogen oxyhalides, sulfur oxyhalides, phosphorus oxyhalides, and mixtures thereof, said contacting being carried on for a period of time of from 1 minute to 24 hours at a temperature of from atmospheric to 400° F. and recovering a resulting carbon black having a substantially reduced pH.

4. A process for treating furnace carbon black having a pH of from 8.5 to 10.1 to substantially lower its pH and thereby increase the scorch time of a rubber mix wherein said carbon black is used which comprises, contacting said carbon black with from 5 to 15 standard cubic feet per pound of said carbon black of a gaseous mixture comprising from 0.01 to 1 volume per cent of an oxyhalide selected from the group consisting of nitrogen oxyhalides, sulfur oxyhalides, phosphorus oxyhalides, and mixtures thereof and a diluent gas, said contacting being carried on for a period of time of from 1 minute to 24 hours and at a temperature of from atmospheric to 400° F. and recovering a resulting carbon black having a pH within the range of 3.0 to 7.5.

5. The process of claim 4 wherein said oxyhalide is NOCl.

6. The process of claim 4 wherein said oxyhalide is $SOCl_2$.

7. The process of claim 4 wherein said oxyhalide is $SO_2Cl_2$.

8. The process of claim 4 wherein said oxyhalide is $POCl_3$.

9. The process of claim 4 wherein said oxyhalide is NOBr.

10. A process for treating loose furnace carbon black having a pH of from 8.5 to 10.1 to substantially lower its pH and thereby increase the scorch time of a rubber mix compounded therewith which comprises: passing said loose carbon black into a pelleting zone; introducing a gaseous mixture comprising from 0.001 to 5 volume per cent of an oxyhalide selected from the group consisting of nitrogen oxyhalides, sulfur oxyhalides, phosphorus oxyhalides and mixtures thereof and a diluent gas into said pelleting zone in an amount of from 1 to 50 standard cubic feet per pound of said carbon black and therein directly contacting said gaseous mixture and said carbon black for from 1 minute to 24 hours at a temperature of from atmospheric to 400° F. while pelleting said carbon black; withdrawing resulting gases and treated carbon black from said pelleting zone and separating same; withdrawing a portion of resulting gases from the system and recycling the remaining portion to said pelleting zone; and withdrawing a portion of resulting treated carbon black pellets from the system and recycling the remaining portion to said pelleting zone.

11. The process of claim 10 wherein said oxyhalide is NOCl.

12. The process of claim 10 wherein said oxyhalide is $SOCl_2$.

13. The process of claim 10 wherein said oxyhalide is $SO_2Cl_2$.

14. The process of claim 10 wherein said oxyhalide is $POCl_3$.

15. The process of claim 10 wherein said oxyhalide is NOBr.

MARTIN R. CINES.
WILLIAM T. NELSON.

References Cited in the file of this patent

UNITED STATES PATENTS

| Number | Name | Date |
|---|---|---|
| 2,210,763 | King | Aug. 6, 1940 |
| 2,408,696 | Smallwood | Oct. 1, 1946 |
| 2,420,810 | Bray et al. | May 20, 1947 |
| 2,439,442 | Amon et al. | Apr. 13, 1948 |
| 2,503,361 | Studebaker | Apr. 11, 1950 |

OTHER REFERENCES

Villers, D. S., Journal of the American Chemical Society, Vol. 69 (1947), page 214.

Zapp, R. L., Ind. Eng. Chem., Vol. 36 (1944), page 128.

Braendle et al., India Rubber World, Vol. 119, Oct. 1948, No. 1, pages 57–62.